United States Patent
Urlass et al.

(10) Patent No.: US 6,597,149 B1
(45) Date of Patent: Jul. 22, 2003

(54) BATTERY SYSTEM

(75) Inventors: Thorsten Urlass, Tuelau (DE); Guenther Logemann, Gifhorn (DE)

(73) Assignee: Volkswagen AG, Wolfsburg/Fallersleben (DE)

( * ) Notice: Subject to any disclaimer, the term of this patent is extended or adjusted under 35 U.S.C. 154(b) by 0 days.

(21) Appl. No.: 10/018,946
(22) PCT Filed: Jun. 21, 2000
(86) PCT No.: PCT/DE00/02007

§ 371 (c)(1),
(2), (4) Date: Apr. 26, 2002

(87) PCT Pub. No.: WO01/01543

PCT Pub. Date: Jan. 4, 2001

(30) Foreign Application Priority Data

Jun. 25, 1999 (DE) ............................. 199 29 246

(51) Int. Cl.[7] .................. H01M 10/44; H01M 10/46
(52) U.S. Cl. .................. 320/104; 307/10.7; 340/455
(58) Field of Search .................. 320/103, 104, 320/126, 127, 137; 340/455, 636; 307/10.7

(56) References Cited

U.S. PATENT DOCUMENTS 5,321,389 A 6/1994 Meister

FOREIGN PATENT DOCUMENTS

| DE | 24 39 533 | 3/1976 |
|---|---|---|
| DE | 38 41 769 | 6/1990 |
| DE | 40 28 242 | 3/1992 |
| DE | 42 11 578 | 4/1993 |
| DE | 196 28 222 | 1/1998 |
| DE | 197 06 946 | 8/1998 |
| EP | 0 537 754 | 4/1993 |
| EP | 0 583 630 | 2/1994 |
| JP | 56-098567 | 8/1981 |

OTHER PUBLICATIONS

Patent Abstracts of Japan, vol. 005, No. 172 (M–095), Oct. 31, 1981.

Primary Examiner—Edward H. Tso
(74) Attorney, Agent, or Firm—Kenyon & Kenyon

(57) ABSTRACT

A battery system includes a generator, a starter and at least one battery, whereby the starter is connected to the battery via a starter line. An electronic pole terminal is arranged between the starter and the battery, and the starter line may be switched in a de-energized manner via the electronic pole terminal.

12 Claims, 1 Drawing Sheet

BATTERY SYSTEM

FIELD OF THE INVENTION

The present invention relates to a battery system and a method for controlling a battery system, in particular in a two-battery system.

BACKGROUND INFORMATION

Such a two-battery system having a vehicle electrical-system battery and a starter battery, which are interconnected when a generator is running, is described in German Published Patent Application No. 38 41 769. In the case in which a small amount of current is being supplied by the generator, this has the disadvantage of the electrical-system battery being charged at the expense of the starter battery, due to charge equalization, when the charge of the electrical-system battery is worse than that of the starter battery. In the conventional vehicle electrical system, a switch is also installed between the electrical-system battery having the electrical-system load circuits, and the remaining part of the vehicle electrical system, the switch being opened in response to the generator shutting down, as soon as the starter-battery voltage falls below a permissible limiting value. This measure only protects the starter battery from being completely discharged when the generator is stopped, and also allows the starter battery to be partially discharged. This poor initial condition increases the load on the starter battery at the beginning of the trip, when the charge of the two batteries is equalized at the expense of the starter battery. In the extreme case, this can result in the complete discharge or destruction of the starter battery.

A two-battery system is described in German Published Patent Application No. 40 28 242, in which the connection between the starter battery and the electrical-system battery can be interrupted, regardless of the driving condition, when the electrical-system battery would otherwise be charged by the starter battery. The two batteries are connected to each other, when the voltage of the electrical-system battery is greater than the starter-battery voltage. If the voltage of the electrical-system battery is less than that of the starter battery, then the two batteries are disconnected from each other. The separation can be performed in various ways, e.g., by disconnecting the starter battery from the rest of the vehicle electrical system.

This prevents the starter battery from being loaded by a discharged electrical-system battery. In the working mode, the generator can power the most important load circuits and simultaneously charge the electrical-system battery. The two batteries can also be disconnected from the rest of the vehicle electrical system by switching off the electrical-system battery. The starter battery can then be charged, when the generator and the starter battery are connected.

When space is limited, the positioning of the starter battery in the motor vehicle is a general problem in the two-battery systems. In order to reduce the fire hazard in accidents, due to electrical short-circuiting, the starter line, which electrically connects the starter to the starter battery in a permanent manner, must be laid through impact-resistant zones in the motor vehicle. This also applies to the starter line in single-battery systems. As an alternative, pyrotechnic battery terminals have been proposed, which are irreversibly severed from the batteries in an explosive manner prior to or during an accident, and thus interrupt the flow of electric current. In this context, the firing control of the pyrotechnic terminals is mostly carried out by a precrash sensory system, which, e.g., evaluates the signals of an airbag control device. In addition to their high cost, the complex firing control of the pyrotechnic terminals is disadvantageous, since inadvertent triggering must be prevented or the motor vehicle can no longer be started. The irreversibility is generally disadvantageous, since the terminals must be replaced after each instance of triggering.

Therefore, it is an object of the present invention to provide a battery system and a method for controlling such a system, which reduce the fire hazard in a simple and cost-effective manner. A further object of the present invention is to simplify the charge management for the starter battery in a two-battery system.

SUMMARY

When at least one electronic pole terminal, by which the starter line may be switched off-circuit, is positioned between the starter and the battery or starter battery in a two-battery system, the starter line, which is normally dead, may be arbitrarily positioned in the motor vehicle, without representing a fire hazard. This increases the degree of freedom in the wiring, since space restrictions are largely eliminated. To this end, the electric pole terminal is only switched through in the actual starting phase and is otherwise operated in the off state. In two-battery systems, depending on the further circuit diagram, it may be ensured that, if the electrical-system battery is connected to the starter or may be connected to the starter to support the starting operation, the electrical-system battery may also be disconnected from the starter line by an electronic pole terminal, so that the de-energized state of the starter line is ensured. In this context, the electronic pole terminals may be of the same kind or may be configured differently, depending on the circuit layout. Another advantage is that, in the standing phase, the electronic pole terminals disconnect the starter battery, along with the load circuits important for starting, from the rest of the vehicle electrical system, so that the starter battery may provide a sufficient starting voltage over long standing phases. When an intended start is detected, the method provides for a start signal (terminal (50)-signal) being generated, by which the electronic pole terminals are switched through in the starting phase and blocked again after the start has occurred. If the motor vehicle is configured to have a mechanical ignition lock, then the terminal (50)-signal is directly generated by turning the ignition key, and the starting procedure is immediately initiated, if the starter battery and possibly the electrical-system battery may provide sufficient voltage. If, however, the motor vehicle is connected to an electronic ignition lock, then a start-enabling control device initially checks if the load circuits relevant for starting receive sufficient supply voltage. If this is the case, then the start-enabling control device generates a terminal (50)-signal, and the electronic pole terminal of the starter battery, and possibly that of the electrical-system battery, are switched through, so that the starter line, which carries a voltage, supplies the starter with a starter voltage and starts the generator. The electronic pole terminals are then blocked again, and the starter line is switched off-circuit. Regardless of the configuration of the ignition lock, it may be ensured that the starter line is only connected in circuit in the immediate starting phase, and is otherwise switched off-circuit.

The electronic pole terminals may be configured to be switchable power semiconductors, by which appropriately large amperages may be switched, using small control currents. In a further example embodiment, the electronic pole terminal takes the form of a CMOS-FET, so that an electrical power loss essentially occurs only in the switching operations. In order to generate appropriate gate voltages, the FET is configured with a charge pump, which functions up to an electrical-system voltage of, e.g., 3 V, and builds up the appropriate gate voltage. However, the closed-circuit current through the CMOS-FET may be neglected in the stationary case, so that the batteries are not loaded. In the switched-through state, such CMOS-FET's have a contact resistance of 0.5 to 0.6 mΩ, so that the voltage drop at 1200 A is only 0.6 to 0.72 V. In the case of cold starting, the resistance is only 0.4 mΩ, so that the voltage drop is only 0.48 V. Therefore, almost all of the battery voltage is available to the starter.

The electronic pole terminal between the starter and the starter battery prevents an external start from occurring any longer in the engine compartment, when the starter battery is discharged. To this end, the starter battery is assigned a tap, e.g., in the form of a busbar, which may connect an external battery to the starter battery. This tap constitutes an external-start aiding point, which may be positioned at an arbitrary location in the motor vehicle, but e.g., in the direct vicinity of the starter battery. These explanations apply analogously to single-battery systems, as well.

In a further example embodiment, a circuit breaker, which is actuated by a signal representing the energization of the generator, is situated between the positive pole of the generator and the positive pole of the starter battery. In this context, the circuit breaker is open in the disconnected state. In the open state, the circuit breaker disconnects the starter battery from the vehicle electrical system, so that the starter battery may not be discharged by the vehicle electrical system. The circuit breaker is closed when the vehicle is operated with an energized generator, so that the load circuits, which are relevant for starting and are also active during vehicle operation, are powered by the electrical-system battery and the generator. The voltage difference between the generator having approximately 14.4 V and the starter battery having a maximum of 12 V ensures that a charging current is directed to the starter battery. In this context, the tap may provide the connection between the starter battery and the circuit breaker, as well. This tap may also be used to connect to an optionally present start-enabling control device, which checks if the load circuits relevant for starting are being supplied with sufficient voltage and, in the case of a positive result, generates the terminal (50)-signal for the electronic pole terminals.

The starter battery, the electronic pole terminals, the tap, and the circuit breaker may be situated under the driver's seat. A further advantage of this arrangement is the increased protection against theft, since the starter battery may no longer be externally manipulated.

DETAILED DESCRIPTION

Figure 1:
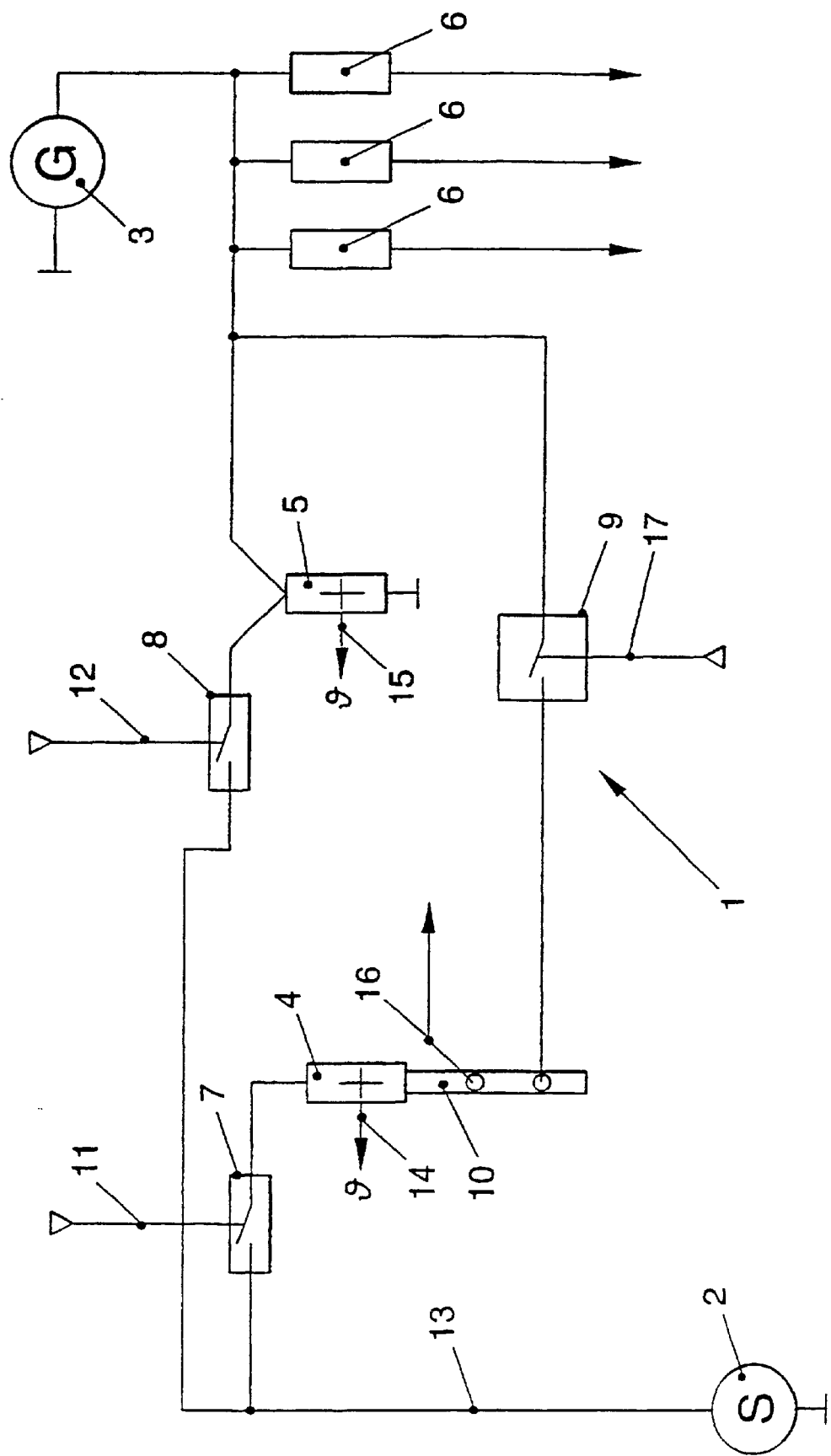
FIG. 1 is a schematic block diagram of a two-battery system according to the present invention.

Two-battery system 1 includes a starter 2, a generator 3, a starter battery 4, an electrical-system battery 5, electrical load circuits 6, an electronic pole terminal 7 positioned between starter 2 and the positive pole of starter battery 4, a pole terminal positioned between starter 2 and the positive pole of electrical-system battery 5, a circuit breaker 9 that is situated between the positive pole of starter battery 5 and the positive pole of generator 3 and the positive pole of electrical-system battery 5, and a tap 10 situated at the positive pole of starter battery 4. The two electronic pole terminals 7, 8 are configured to have a control line 11, 12, respectively, via which electrical pole terminals 7, 8 may receive a terminal (50)-signal. Starter 2 is electrically connected to the two electronic pole terminals 7, 8, by a starter line 13. In addition, starter battery 4 and electrical-system battery 5 are connected to temperature-monitoring devices 14, 15, respectively.

In the disconnected state, electronic pole terminals 7, 8 and circuit breaker 9 are open. In the case of a semiconductor, this means that they are polarized in the non-conducting direction. Only the general terms, open and closed, are discussed below, which is indicated by the representation of electronic pole terminals 7, 8 as switches. This de-energizes starter line 13. If an accident occurs in the disconnected state, then a short circuit on starter line 13 may therefore not represent a source of danger, since it is de-energized. The required closed-circuit current for the electrical load circuits in the vehicle electrical system is supplied by electrical-system battery 5, as usual, while starter battery 4 is disconnected from the rest of the vehicle electrical system by open circuit breaker 9, and only has to supply the closed-circuit current for the load circuits relevant to starting.

If the motor vehicle driver now wishes to start the motor vehicle, then a signal representing the operation of the ignition lock is detected, depending on the configuration of the ignition lock as a mechanical or electronic ignition lock. In the case of a mechanical ignition lock, the closing of the switch directly generates a terminal (50)-signal. However, in the case of an electronic ignition lock, only the intended starting command is initially detected. A starter-enabling control device then checks if the load circuits relevant for starting have sufficient supply voltage, the start-enabling control device being connected to starter battery 4 by a supply line 16, via tap 10. If the load circuits relevant for starting are sufficiently supplied with voltage, then the start-enabling control device generates a terminal (50) signal, which is applied to the two control lines 11, 12. The start-enabling control device may check if an accident has occurred in the standing phase, by evaluating an airbag control device. A possible short circuit may also occur on starter line 13, due to the evaluation of the currents through electronic pole terminals 7, 8, whereby electronic pole terminals 7, 8 are then blocked.

The terminal (50)-signal causes the two electronic pole terminals 7, 8 to close, and the voltage of starter battery 4 and electrical-system battery 5 is applied to starter 2, via starter line 13, the voltage drops across electronic pole terminals 7, 8 being negligible. After starter 2 is fully engaged and generator 3 is running, the two electronic pole terminals 7, 8 are opened, and starter line 13 is de-energized again. Therefore, if an accident occurs while driving, then short circuits on starter line 13, such as in the case of standstill, are not critical.

Because of electronic pole terminal 7, a separate external-start aid point has to exist. Tap 10, to which an external battery may be connected if starter battery 4 is too highly discharged, may be used for this purpose. After starter battery 4 is charged by the external battery, then the load circuits relevant for starting, including a possibly existing start-enabling control device, are again supplied with sufficient voltage by starter battery 4, so that the further starting operation proceeds as described above.

Very simple charge management for starter battery 4 may be realized using circuit breaker 9, which may receive a signal characterizing the operating state of generator 3, via control line 17. As long as generator 3 is not energized, circuit breaker 9 is open and starter battery 4 is not loaded by the rest of the vehicle electrical system. Circuit breaker 9 is only closed when generator 3 is energized, i.e. provides the vehicle electrical system and electrical-system battery 5 with sufficient voltage, a flow of current directed from generator 3 to starter battery 4 being ensured by the voltage difference between generator 3 and starter battery 4. This prevents starter battery 4 from being loaded during vehicle operation by the load circuits, which are relevant for starting and are also active during vehicle operation, such as the electrical-system control device.

What is claimed is:

1. A battery system, comprising:
   a generator;
   a starter;
   a starter line;
   at least one battery, the starter connected to the battery via the starter line; and
   a first electronic pole terminal arranged between the starter and the battery, the starter line switchable off-circuit by the first electronic pole terminal except in a starting phase.

2. The battery system according to claim 1, wherein the battery includes a starter battery of a two-battery system.

3. The battery system according to claim 2, wherein the battery includes a starter battery and an electrical-system battery, the battery system further comprising a second electronic pole terminal arranged between the starter and the electrical-system battery, the starter battery and the electrical-system battery connectable in parallel via the first electronic pole terminal and the second electronic pole terminal.

4. The battery system according to claim 1, wherein the first electronic pole terminal includes a switchable power semiconductor.

5. The battery system according to claim 1, wherein the first electronic pole terminal includes a CMOS field-effect transistor.

6. The battery system according to claim 1, further comprising a tap assigned to the battery, an external battery being connectable to the battery via the tap.

7. The battery system according to claim 2, further comprising a circuit breaker, the generator and the starter battery interconnected by the circuit breaker.

8. The battery system according to claim 7, wherein the circuit breaker is controllable in accordance with a generator-operation signal.

9. The battery system according to claim 1, wherein at least one of the battery and the first electronic pole terminal is arranged in a vehicle interior.

10. The battery system according to claim 6 wherein at least one of the starter battery, the first electronic pole terminal and the circuit breaker is arranged in a vehicle interior.

11. A method for controlling a battery system including a generator, a starter, a starter line, at least one battery, the starter connected to the battery via the starter line, and a first electronic pole terminal arranged between the starter and the battery, the starter line switchable off-circuit by the first electronic pole terminal except in a starting phase, comprising the steps of:
    detecting a user-intended start;
    generating a start-signal by which the first electronic pole terminal is switched through; and
    switching-off the start-signal when start-up of the generator is detected.

12. A method for controlling a battery system including a generator, a starter, a starter line, at least one battery including a starter battery of a two-battery system, the starter connected to the battery via the starter line, a first electronic pole terminal arranged between the starter and the battery, the starter line switchable off-circuit by the first electronic pole terminal except in a starting phase, and a circuit breaker, the generator and the starter battery interconnected by the circuit breaker, comprising the steps of:
    detecting start-up of the generator; and
    switching-through the circuit breaker in accordance with a signal representing an energized operation of the generator.

* * * * *